Sept. 22, 1964         G. KULBICKI ET AL         3,149,750
                      DISPENSING APPARATUS Filed Oct. 2, 1961                              3 Sheets-Sheet 1

INVENTORS
GEORGES KULBICKI
FLAVIEN LAZARRE
BY
Bacon & Thomas
ATTORNEYS

Sept. 22, 1964  G. KULBICKI ET AL  3,149,750
DISPENSING APPARATUS

Filed Oct. 2, 1961  3 Sheets-Sheet 2

INVENTORS
GEORGES KULBICKI
FLAVIEN LAZARRE
BY
Bacon & Thomas
ATTORNEYS

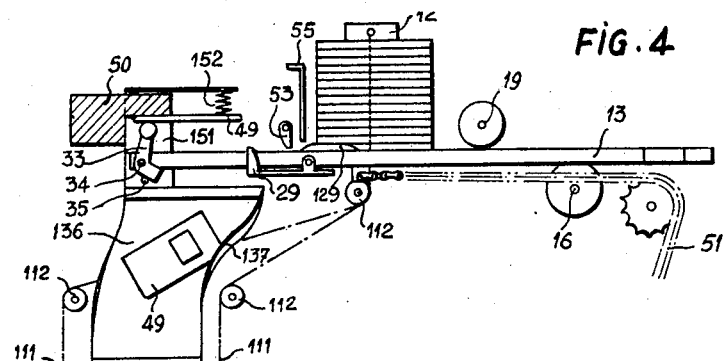
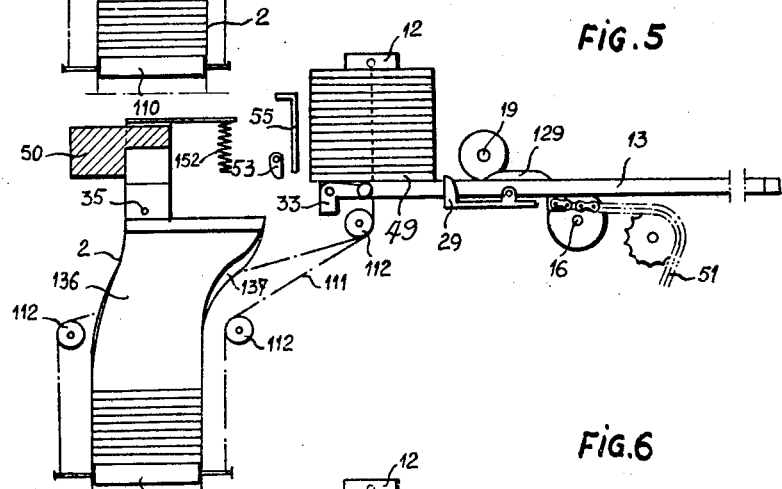
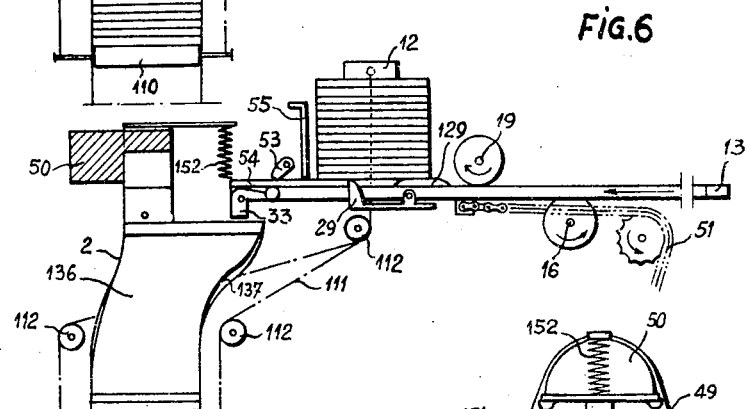
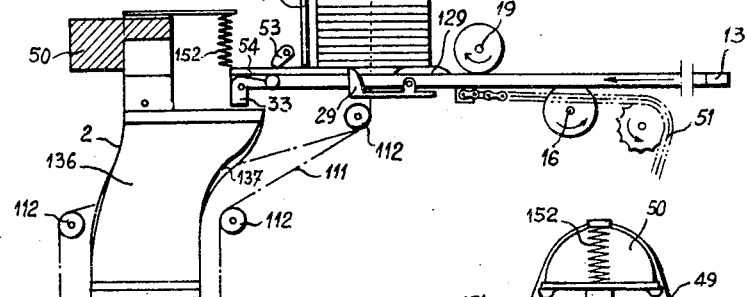
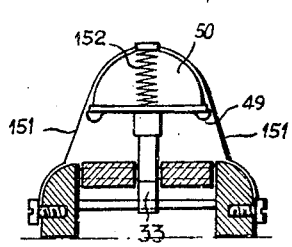
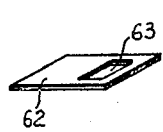

3,149,750
DISPENSING APPARATUS
Georges Kulbicki and Falvien Lazarre, both of Pau, France, assignors to Societe anonyme dite: Societe Nationale des Petroles d'Aquitaine, Paris, France, a French company
Filed Oct. 2, 1961, Ser. No. 142,120
Claims priority, application France Oct. 10, 1960
4 Claims. (Cl. 221—224)

This invention relates to apparatus for automatically and cyclically dispensing in sequence each of a plurality of generally small, flat articles or objects at a dispensing station. The invention has been developed in connection with and relates more specially to the problem of sequentially feeding a large number of slides containing product samples to X-ray apparatus for diffraction analysis and similar tests.

The advent of automation and advanced inspection techniques in the chemical and related industries has introduced a demand for automatic mechanical transfer equipment not heretofore available on the market. Thus in many plants it has now become common practice to subject samples of a chemical or other product to X-ray inspection for continuously determining whether a production process is up to par. Unless the inspection procedure is to hold up the actual production it is essential that the inspection operations be performed at the same high rate as the production process itself. It is an object of this invention to provide improved mechanism for achieving this result. Another object is to provide apparatus for sequentially dispensing each of a plurality of similar flat objects, such as sample slides for X-ray examination, to a dispensing station, with a high degree of regularity, at a rapid rate, and with a high degree of reliability and positiveness in the positioning and retention of each object at said station. The usual desirable requisites of simplicity, ruggedness and economy of course also form objects of the invention.

Broadly the apparatus of the invention is of the type including a frame, feeder means supporting a stack of the flat elements to be dispensed upon the frame, a platen reciprocable on the frame and having an upper surface engageable with a lowermost element of the stack, means for reciprocating the platen, and means on the platen operative at each forward stroke of platen reciprocation to push a lowermost element forward and away from the stack and for blocking said element in an operative position.

One important feature of the invention relates to the means for reciprocably supporting the platen on the frame. According to the invention such means may comprise pairs of transversely spaced rollers journalled across the frame on longitudinally spaced transversely extending axes for engagement with the underside of the platen and upper roller means journalled above the frame for engagement with the upper side of the platen. Preferably, corresponding rollers of the longitudinally spaced pairs have endless flexible cords or the like trained around them, and engageable in transversely spaced grooves in the underside of the platen. It has been found that the platen mounting means described greatly enhances the smoothness and accuracy of platen reciprocation, while at the same time being simple, reliable and rugged.

Other features of the invention are concerned with improved mechanism for pushing said lower-most element of the stack toward and retaining it at its operative position as well as the means for discharging the element from said position to disposal after use at said position.

The above and further objects, advantages and features of the invention will appear as the disclosure proceeds, with reference to the accompanying drawings in which an exemplary embodiment of the invention is shown by way of illustration but not of limitation. In the drawings.

Figure 1:
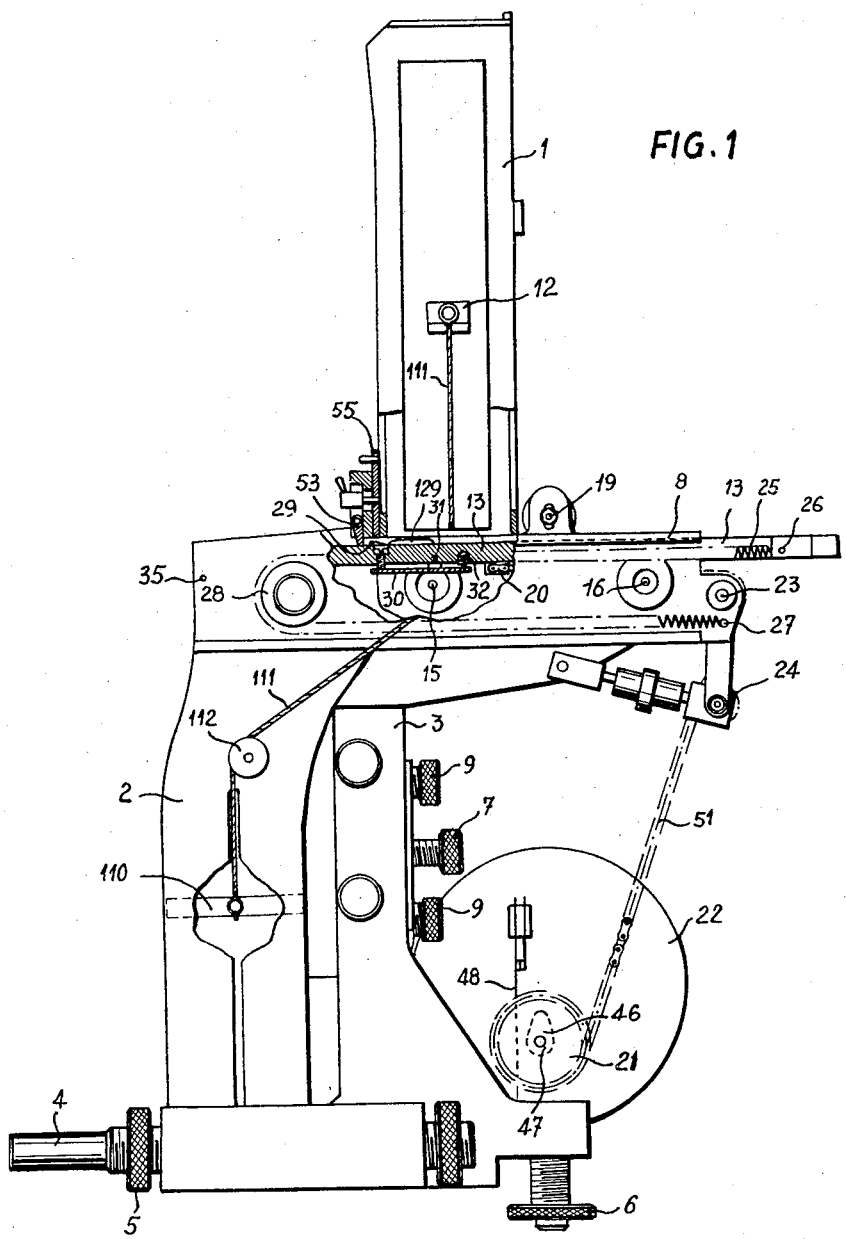
FIG. 1 is a side elevational view, with parts in section and parts broken away, of dispensing apparatus according to the invention as embodied in an attachment for an X-ray inspection unit in an industrial plant.

FIGS. 4 to 6 are partial and more or less schematic views, seen from the same side as FIG. 1 and illustrating various stages of the operating cycle of the machine. Specifically FIG. 4 shows the platen in fully advanced position with a slide element positioned at the operative position for X-ray inspection; FIG. 5 shows the platen in its fully retracted position, and FIG. 6 shows the platen at an intermediate position during its advancing movement, as the lowermost element in the stack is being pushed forward away from the stack;

FIG. 7 is an end view from the left of FIG. 4 illustrating features of the fixture against which an element is held in operative position for X-ray inspection;

FIGS. 8 and 9 are perspective views showing the two parts of a two-part sample-holding slide assembly suitable for use in the apparatus according to the invention; FIG. 8 illustrates a supporting plate and FIG. 9 the sample holding slide.

Figure 2:
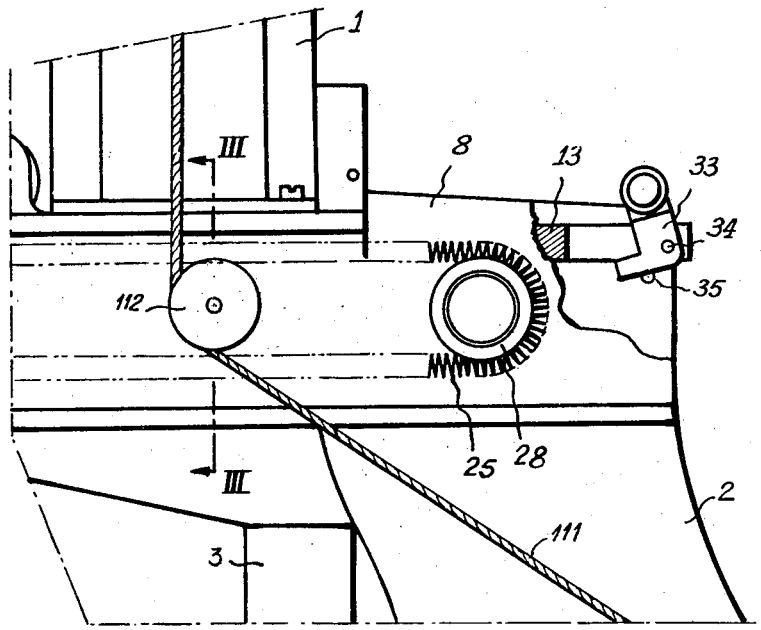
FIG. 2 is a detail elevational view of a part of the apparatus of FIG. 1, shown on an enlarged scale, and seen from the opposite side from that from which the view of FIG. 1 is taken.
Figure 3:
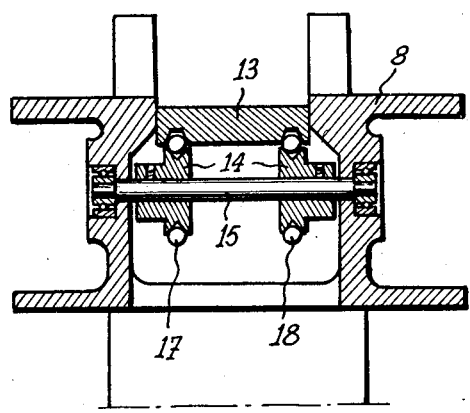
FIG. 3 is a transverse cross section on line III—III of FIG. 2 illustrating the improved means for mounting the reciprocaitng platen.

Referring especially to FIGS. 1 and 2, the apparatus shown comprises a frame member in the form of an upstanding bracket arm 3 securable to a support, not shown, by means such as the rods 4. The supporting structure to which the frame 3 of the apparatus is attached may form part of an X-ray testing unit as will be more fully understood hereinafter. Nuts 5 on a threaded portion of the mounting rod 4 serve to adjust the bracket 3 horizontally relative to the supporting structure, while a vertical screw 6 similarly permits adjustment of the vertical position of the bracket. Fixedly or adjustably secured to the bracket 3 by means of screws such as 9 is a base frame member or table generally designated 8 which, as shown more clearly in FIG. 3 in cross sectional contour, is internally recessed.

Fixed to the stationary structure including bracket 3 and table 8 are, further, a feeder unit 1 attached, e.g. screwed to the top of the table 8 at a position somewhat spaced from the end of the table adjacent the X-ray unit (the left hand end in FIG. 1), and a discharge unit 2 which is secured to the bracket 3 by means of screws 9 at the end of the table 8 adjacent the X-ray unit, and which discharge unit is positioned below the table 8 and is connected therewith by a chute as will be more fully described later.

The feeder unit 1 is adapted to contain therein a stack of sample-holding slides or plates to be inspected, such stack being indicated in FIGS. 4 to 6. After inspection the slides are discharged into the discharge unit 2, as will be later described, and they are there contained in another stack with the lowermost slide supported on a supporting plate 110 slidable vertically in the discharge unit 2 support plate 110 is connected by a pair of flexible elements 111, e.g. wires, trained over guide pulleys 112 suitably journalled in the frame, to a topping plate 12 which rests upon the uppermost slide in the stack contained in the feeder 1. It may thus be already understood that, as the slides are consecutively inspected at the X-ray station, the supporting plate 110 is gradually lowered in incremental steps as the stack in feeder 1 diminishes in height while the stack in discharge unit 2 concurrently increases in depth.

For supporting the lowermost slide of the stack in feeder 1 there is provided a platen 13 which is contained within the recess of frame plate 8 (see FIG. 3) and is slidable longitudinally of the frame, i.e. left and right according to FIG. 1. For this purpose the platen 13 is supported on two pairs of rollers 14, each pair being secured in spaced relation on a shaft, 15 and 16 respectively, journalled in ball bearings in the opposite side flanges of the table member 8. As shown, the corresponding rollers 14 of the respective pairs are preferably interconnected by endless ropes 17 and 18, the upper flights of which are received in parallel grooves provided therefor in the under side of platen 13. There is further provided a pair of upper rollers secured on a shaft 19 journalled between lugs upstanding from the sides of the table 8 and said rollers bearing on the upper face of the platen 13 for positively guiding it in a horizontal plane.

Attached to the underside of platen 13 is one end of a chain 20 which is trained over a guide sprocket 23 journalled at the far end of table 8, and over a tensioning sprocket 24 journalled on an adjustable arm, and the free end of the chain being attached to a drive sprocket 21 mounted on the output shaft of a motor-reducer drive unit 22 supported on the base of bracket 3. An elongated tension spring 25 has one end attached to the end of platen 13 at 26, the spring being trained around a guide pulley 28 journalled in the table 8 and having its other end 27 attached to the table. While a single spring 25 is shown, two similar and symmetrically disposed springs may be provided. It will be understood that with the arrangement described, rotation of the motor-reducer 22 in a direction to rotate drive sprocket 21 clockwise (FIG. 1) will act through chain 51 to retract the platen 13 rightwardly in that figure, while when the motor is deenergized or disengaged from sprocket 21, the action of spring 25 will advance the platen back in the leftward direction.

The description of the apparatus will now proceed, for clarity, in terms of the operation thereof, with various additional components not yet mentioned being described in turn as they become involved in the operating cycle.

Referring to FIGS. 4–7 the initial point of the operating cycle may be taken as the position shown in FIG. 4 where platen 13 is positioned at the extreme left hand end position of its reciprocation, i.e. adjacent the X-ray unit. At this time, a slide 49 picked off the bottom of the stack in feeder 1 during the preceding cycle in a manner to be latter explained, is being held in a horizontal viewing position at the X-ray station, with an end portion of the slide applied against the under surface of a fixture 50 of the X-ray apparatus, by one arm of a bell-crank lever 33 pivoted at 34 to the adjacent end of platen 13. The holding arm of lever 33 engaging slide 49 is preferably rubber-lined at its tip. The lever 33 is retrained in its holding position, as shown in FIG. 4, by engagement of its other arm with a stop 35 projecting from the table 8 at the left hand end of said table. The stack of slides contained in feeder 1 is being held in raised position, spaced from the surface of table 8, by a distance equal to that of the slide 49, by a cam member 129 secured to the upper surface of platen 13 and having a flat upper surface of a height above the platen corresponding to the thickness of a slide 49; the cam 129 is provided with tapered end ramps as shown for reasons that will appear presently.

After a prescribed time as required for the X-ray inspection a slide 49, the motor unit 22 is energised. This energization may conveniently be effected by means of an adjustable contact switch attached to the movable goniometer section of the X-ray apparatus, whereby the tice period of each cycle alloted to the actual viewing operation can be made to correspond accurately with the time required for viewing a predetermined angular field or aperture. However, other means may of course be provided for determining the instant of motor energization. The motor now acts through chain 51 to draw the platen 13 to the right, i.e. retract the platen from the position of FIG. 4 towards that shown in FIG. 5. At the start of this movement the bell-crank lever 33 disengages stop 35 and is allowed to rotate (by gravity and/or the action of a spring not shown) so that its upper arm disengages slide 49 and returns to a horizontal position (FIG. 5). The slide 49 is now allowed to drop into a chute 136 provided with a guiding wall 137, which guides the slide smoothly into position upon the stack already present within the discharge unit 2.

As the platen 13 recedes to the right, the camming hump 129 slides under the stack in feeder 1, and continues to hold the stack in spaced position above the platen for a certain initial period of the displacement. A pusher member 29 in the form of a lever or platelet 30 pivoted at 31 to the underside of platen 13 and having an upwardly projecting end is provided, and will serve in a later part of the cycle to push the lowermost slide of the feeder stack into viewing position as will be presently described. During the stage now being described this lever is allowed to enter the space under the stack following the hump 129. As the tapered trailing end of hump 129 disengages the stack, the stack is allowed to move progressively and smoothly downward into contact with the upper surface of platen 13, and the lever 29 is at this time rotated to a retracted position comprising the projecting spring 32. After the lever 29 has moved past the stack, as in FIG. 5, it resumes its operative position projecting above the surface of the platen.

As the platen reaches its end position shown in FIG. 5, a cam finger 46 (FIG. 1) carried by drive sprocket 21 opens a contact switch 48 deenergizing the motor 22. Spring 25 now acts to draw the platen 13 forward, i.e., to the left in the drawings. Pusher lever 29 now engages the bottommost slide of the feeder stack, as indicated in FIG. 6 and pushes it forward, while the hump 129 acts to hold the stack in its elevated position as earlier described. The said lowermost slide is propelled by pusher lever 29 and moves past a vertical wall 55 of the feeder the lower end of which is so positioned that it only allows the passing of one slide at a time, thereby preventing entrainment of adjacent slides of the stack by friction. As will be noted from FIG. 6, the forward portion of the slide being propelled is overlying the active arm of bell-crank lever 33, and as the platen approaches the forward (left) end of its stroke, the lever 33 is rotated by engagement with stop 35 (see FIG. 4), thereby raising the front portion of the slide into position against the under surface of fixture 50 as earlier described. At the same time, a compression spring 152 projecting from an arm secured to the top of fixture 50 is brought to bear lightly against the rear portion of the upper slide surface to prevent the slide from being prematurely withdrawn by the action of pusher 29. The fixture 50 has a pair of sidewalls 151 which locate the transverse position of the slide and ensure that all the samples will be correctly and uniformly positioned for viewing.

Element 53 is a retractible abutment which deflects to permit the passing of slide in the forward (leftward) direction but prevents reverse movement of the slide and ensures its proper discharge.

FIGS. 8 and 9 illustrate one convenient construction of a sample slide assembly usable with the apparatus described. Assembly is in two parts, including a support 59 (FIG. 8), e.g., brass, press-formed with rounded flanges 60, 61 along its sides, and defining grooves for the positioning of the slide proper shown at 62 in FIG. 9, which has a window 63 cut out in it for the positioning of a sample to be examined, e.g., in powder form. The rounded side flanges 60, 61 permit a smooth sliding of the slide assembly through the apparatus without damage to the sample. The flanges cooperate with the guide wall 137 of the discharge chute to guide the discharged slide over a desired path on to the discharge stack, during which movement the slide is caused to describe substantially 90° of rotation.

What we claim is:

1. Apparatus for sequentially positioning each of a plurality of flat elements at an operative position, comprising: a frame; a platen reciprocable on the frame towards and away from said operative position; means on the frame for supporting a stack of said elements with the lowermost element in engagement with the platen; a pusher carried and projectable above the platen for engaging the rear end of said lowermost element as the platen is advanced towards said position and for pushing said element forward from the stack; an arm pivoted to the platen and normally underlying a forward portion of said element as it is being pushed toward said position; a downwardly directed frame surface at said operative position disposed above said arm when said platen is in said position for cooperation with said arm to hold an element therebetween; means projecting from the frame adjacent said operative position and cammingly engageable with said arm as the platen reaches said position for rotating the arm to a position above said platen and raising the overlying element upwardly against said frame surface at said operative position; means rotating said arm from said position above said platen to said normal position as the platen recedes from said operative position whereby said element is released; discharge means mounted on said frame adjacent said position for receiving the released elements; and means for cyclically reciprocating the platen.

2. The apparatus claimed in claim 1, including a ramp member positioned on said platen rearwardly of said pusher and spaced therefrom a distance substantially less than the length of said elements, said ramp member having a flat top disposed at an elevation above the platen corresponding to the thickness of an element and having downwardly sloping forward and rear ends, whereby as said platen is moved forward to said operative position said ramp member will hold the stack in a raised condition after said lowermost element has been pushed forward from the stack and until the platen has receded from said operative position by a predetermined amount and will thereafter ease the stack progressively down upon the platen.

3. Apparatus for sequentially positioning each of a plurality of flat elements at an operative position, comprising: a frame; a platen reciprocable on the frame towards and away from said operative position; means on the frame for supporting a stack of said elements with the lowermost element in engagement with the platen; a pusher carried and projectable above the platen for engaging the rear end of said lowermost element as the platen is advanced towards said position and for pushing said element forward from the stack; an arm pivoted to the platen and normally underlying a forward portion of said element as it is being pushed toward said position; a downwardly directed frame surface at said operative position disposed above said arm when said platen is in said position for cooperation with said arm to hold an element therebetween; means projecting from the frame adjacent said operative position and cammingly engageable with said arm as the platen reaches said position for rotating the arm to a position above said platen and raising the overlying element upwardly against said frame surface at said operative position; a spring member projecting downwardly from said frame adjacent said frame surface and engageable with the upper side of said element adjacent said rear end thereof to resiliently maintain said element in engagement with said pusher during the initial rotation of said arm; means rotating said arm from said position above said platen to said normal position as the platen recedes from said operative position whereby said element is released; discharge means mounted on said frame adjacent said position for receiving the released elements; and means for cyclically reciprocating the platen.

4. Apparatus for sequentially dispensing a plurality of flat elements at a dispension station, comprising: a frame; feeder means supporting a stack of said elements on the frame; a platen reciprocable on the frame between said dispensing station and a retracted position and having an upper surface engageable with the lowermost element of the stack; means reciprocably mounting the platen on the frame and comprising pairs of transversely spaced rollers journalled across the frame below said platen on longitudinally spaced, transversely extending axes in engagement with the underside of the platen and upper roller means journalled on the frame above said platen in engagement with the upper side of the platen; means on the platen for pushing the lowermost element of said stack forward and away from the stack toward said dispensing station at each forward stroke of platen reciprocation; drive motor means on the frame including a rotatable drive sprocket gear operably connected to said drive motor, a sprocket chain in driving engagement with said gear, one end of said chain being attached to said platen and means for actuating said drive motor when said platen is at said dispensing station for moving said platen from said dispensing station to said retracted position and for deactuating said drive motor when said platen reaches said retracted position; and elongated tension spring means having respective ends attached to said platen and to said frame for moving the platen from said retracted position to said dispensing station.

References Cited in the file of this patent

UNITED STATES PATENTS

| | | |
|---|---|---|
| 78,081 | Goodwyn | May 19, 1868 |
| 842,741 | Young | Jan. 29, 1907 |
| 1,281,639 | Nichols | Oct. 15, 1918 |
| 1,298,417 | Stillwaggon | Mar. 25, 1919 |
| 1,437,112 | Lepine | Nov. 28, 1922 |
| 1,748,720 | Lafferty | Feb. 25, 1930 |
| 2,639,960 | Frederick | May 26, 1953 |